United States Patent [19]

Bakx et al.

[11] Patent Number: 5,471,457
[45] Date of Patent: Nov. 28, 1995

[54] METHODS AND DEVICES FOR RECORDING ONE OR MORE SIGNALS WHICH HAVE BEEN ENCODED BY ON ERROR DETECTION AND CORRECTION ALGORITHM ON A RECORD CARRIER BY MEANS OF AN OPTIMAL RECORDING INTENSITY

[75] Inventors: Johannes L. Bakx; Johannes H. M. Spruit; Hindrik Veldhuis, all of Eindhoven, Netherlands

[73] Assignee: U.S. Philips Corporation, New York, N.Y.

[21] Appl. No.: 148,781

[22] Filed: Nov. 5, 1993

[30] Foreign Application Priority Data

Nov. 20, 1992 [EP] European Pat. Off. .............. 92203585

[51] Int. Cl.$^6$ .................................................. G11B 11/10
[52] U.S. Cl. ................................ 369/116; 369/13; 369/48; 369/44.39
[58] Field of Search ................................ 369/13, 14, 48, 369/44.39, 275.2, 275.3, 116

[56] References Cited

U.S. PATENT DOCUMENTS 4,901,300  2/1990  Van Der Zande et al. ............... 369/47
4,914,643  4/1990  Maeda ........................................ 369/13
5,048,003  9/1991  Baggen et al. ............................ 369/59
5,249,172  9/1993  Hagihara et al. .......................... 369/48

FOREIGN PATENT DOCUMENTS 0265904  5/1988  European Pat. Off. .
0326206  8/1989  European Pat. Off. .
0400726  12/1990 European Pat. Off. .
0319101  6/1993  European Pat. Off. .
0312143  8/1993  European Pat. Off. .
8602304  4/1988  Netherlands .

Primary Examiner—David C. Nelms
Assistant Examiner—Vu A. Le
Attorney, Agent, or Firm—Richard A. Weiss

[57] ABSTRACT

A method and device for recording signals on a record carrier with the aid of a radiation beam (15). The signals are recorded in the form of optically detectable marks in parallel tracks which have a substantially constant track pitch. The recording intensity of the radiation beam is set in such a way that with a "minimum" recording intensity information patterns are recorded with a low desired error rate "(Block) Error Rate". Furthermore, a method and device are described by which the "minimum" recording intensity of the radiation beam can be determined.

34 Claims, 3 Drawing Sheets

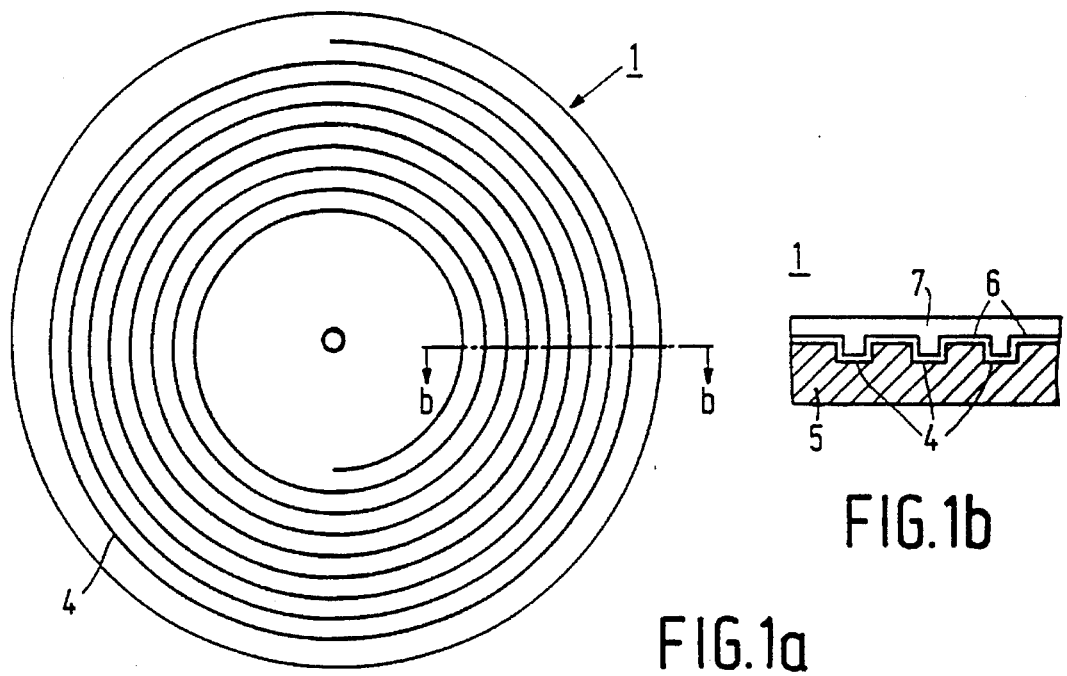
FIG.1b
FIG.1a
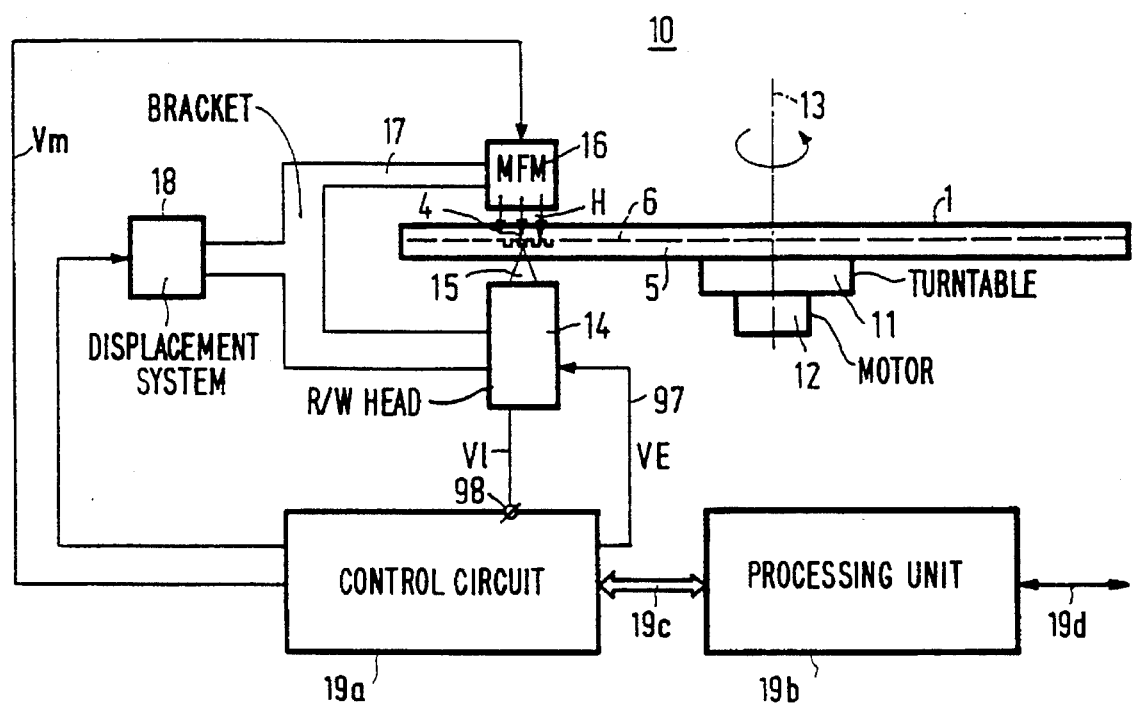
FIG.2

METHODS AND DEVICES FOR RECORDING ONE OR MORE SIGNALS WHICH HAVE BEEN ENCODED BY ON ERROR DETECTION AND CORRECTION ALGORITHM ON A RECORD CARRIER BY MEANS OF AN OPTIMAL RECORDING INTENSITY

BACKGROUND OF THE INVENTION

The invention relates to a method of recording signals on a record carrier of a type that can be overwritten. Information patterns of optically detectable marks are recorded on the record carrier in substantially parallel tracks. The tracks are scanned by a radiation beam, and the marks are obtained by the radiation beam locally heating a suitable recording layer of the record carrier. The energy contents of the radiation beam are set in response to detection of undesired signals from a test information pattern recorded with the radiation beam.

The invention further relates to a recording device for recording signals in substantially parallel tracks on a record carrier of a type that can be overwritten. The recording device comprises a scanning unit for scanning the tracks with a radiation beam for the purpose of introducing in the tracks information patterns of optically detectable marks which correspond to the signal patterns; and a setting unit for setting the recording intensity of the radiation beam with the aid of a setting signal to be applied to the setting unit, the setting signal being dependent on the detection of undesired signals from a test information pattern recorded with the radiation beam.

A similar method and device for recording signals on a record carrier is known from European Patent Application No. ("EP-A") 0 400 726. The method and recording device described in that application give a procedure for media calibration by which a recording intensity is determined for a radiation beam by which information patterns are introduced in the recording layer of a record carrier. The media calibration described in EP-A 0 400 726, comprises the following steps:

a. a first information pattern having a first frequency is recorded in a track with a maximum recording intensity of the radiation beam;

b. then, in the same track, a second information pattern having a second frequency is recorded with a low, minimum recording intensity of the radiation beam;

c. then, the information recorded in the track is read out and, the read signal is applied to a detection mechanism tuned to the frequency of the first information pattern;

d. if signal rests of the first information pattern (having the first frequency) are still detected, steps b to d are repeated, the recording intensity for each repetition being increased by a specific desired randomly selectable step.

Once rests of the first information pattern (having the first frequency) are no longer detected in step d, an intensity setting of the radiation beam is found at which there is a guaranteed minimum error rate of the information pattern to be recorded and subsequently read out.

What has just been described is illustrated with reference to FIGS. 7 and 8 of EP-A 0 400 726, with FIG. 8 representing an error rate characteristic as a function of the intensity of the radiation beam used for recording. The method and device described in EP-A 0 400 726 provide a setting of the radiation intensity which is situated substantially in the middle of a flat domain of the error rate characteristic in which the error rate is low. Although this provides a highly reliable recording of information patterns, with a very low error rate, there are nevertheless several inherent disadvantages, for example: specially designed hardware is necessary for generating the information patterns having a first and a second frequency, and for detecting the rests of the first information pattern (having the first frequency). A further disadvantage is that the first information pattern (having the first frequency) is recorded with full power of a laser diode which generates the radiation beam. Having the laser diode operated at full power is disadvantageous in that this shortens its useful life.

SUMMARY OF THE INVENTION

It is one of the objects of the invention to provide a method, as well as a recording device, for which no additional hardware is necessary in the recording device for determining an optimum recording intensity setting for a laser beam at which the information patterns recorded therewith have a desired low error rate.

It is a further object of the invention to provide a method and a recording device in which information patterns having a minimum error rate can be recorded with a minimum recording intensity.

A method according to the invention comprises the steps described in the opening paragraph and is characterized in that the test information pattern is a randomly selectable data pattern coded by means of an error detection and correction algorithm. The test information pattern is recorded with a selected recording intensity of the radiation beam. Thereafter, the test information pattern is read out and an error rate in the test data pattern is established by means of the error detection and correction algorithm. Thereafter, in response to the error rate, a setting for the recording intensity of the radiation beam is selected for information pattern recording.

The method according to the invention utilizes the error detection and correction algorithm used when signals are recorded. If a recorded test information pattern is read out and processed by means of the error correction and detection algorithm, which test information pattern is derived from a randomly or freely selectable data pattern, the magnitude of the error rate in the known test information pattern can be established. By means of the error rate found, the setting of the radiation beam can be adjusted in the desired direction of intensity.

A recording device according to the invention comprises the elements included in the recording device described above; a reading device for reading a test information pattern recorded with the radiation beam; and a programmed data processing unit for encoding the test information pattern by means of an error detection and correction algorithm, for determining an error rate in the test information after it is recorded and read out, and for determining the setting signal in dependence on the detected error rate.

A recording device according to the invention utilizes a programmed data processing unit already used in the recording device for encoding information patterns by means of an error detection and correction algorithm and for decoding recorded information patterns by means of the error detection and correction algorithm. When a test information recorded and read out is decoded, an error rate is determined on the basis of which a setting signal for the setting unit (to set the beam intensity of the radiation beam) is found.

An embodiment according to the invention with automatic optimum setting of the beam intensity is especially suitable for recording devices in which the recording of the marks strongly depends on the recording intensity, like, for example, in magneto-optical recording devices. However, the invention is not restricted to magneto-optical recordings but may alternatively be applied to other recording principles, such as, for example, recordings that can be overwritten on record carriers of the phase-change type, for which a record carrier is used whose structure, when scanned by a radiation beam, can be changed from amorphous to crystalline and vice versa depending on the radiation method.

BRIEF DESCRIPTION OF THE DRAWINGS

Further embodiments as well as advantages thereof will be described in detail with reference to the drawings, in which:

FIGS. 1a and 1b show a record carrier;

FIG. 2 shows a magneto-optical device according to the invention;

DETAILED DESCRIPTION OF THE PREFERRED EMBODIMENTS

Figure 3:
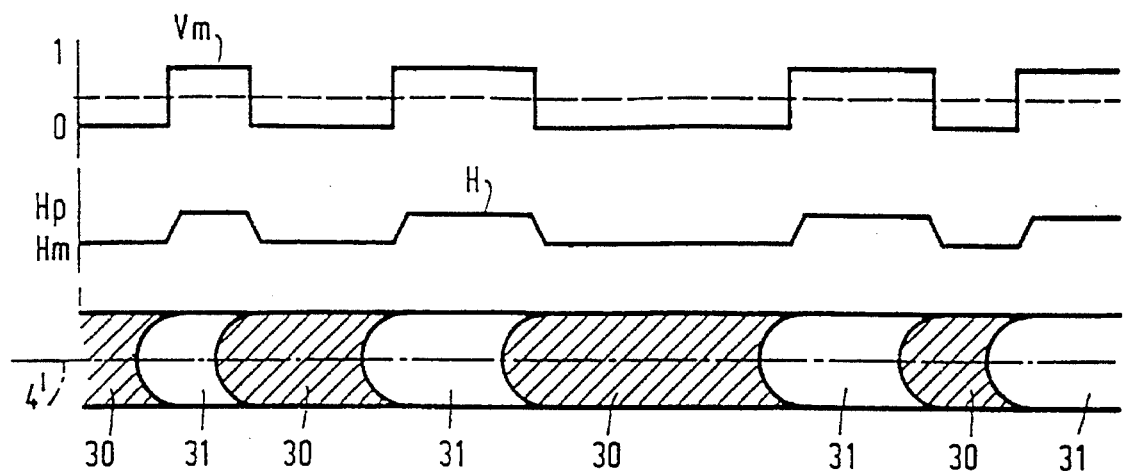
FIG. 3 shows a recording signal and an associated information pattern.

FIGS. 1a and 1b show an embodiment of a record carrier 1 of a type that can be overwritten, in which FIG. 1a shows the top view and FIG. 1b shows a small part of the section along line b—b. The record carrier 1 comprises a track pattern presenting information areas located substantially concentrically relative to each other, which areas are intended for recording information in the form of information patterns of optically detectable marks. The track pattern may have, for example, a continuous helical servo-track 4 denoting the middle of the information areas. The concentric information areas, however, may also be denoted by a structure of commonly termed servo-patterns, as has been described, for example, in Dutch Patent Application NL-A 8702905 (to which EP-A 0 319 101 and U.S. Pat. No. 5,048,003 correspond). For recording purposes, the record carrier 1 comprises a recording layer 6 deposited on a transparent substrate 5 and covered by a protective coating 7. The recording layer 6 is of a material suitable for magneto-optical recording. It should be noted that information layer 6 may, however, also be made up of a different material, for example, a phase-change material, whose structure may be changed from amorphous to crystalline and vice versa by suitable radiation methods.

FIG. 2 shows an embodiment of a magneto-optical recording device 10 according to the invention for recording information on the record carrier 1. The recording device 10 comprises a turntable 11 and a drive motor 12 for causing the record carrier 1 to rotate around an axis 13. Opposite to the rotating record carrier 1 is an optical read/write head 14 of a customary type suitable for magneto-optical recording and reading, with which a radiation beam 15 is focused on the recording layer 6. The recording device 10 also comprises a customary servo-tracking device (not shown) for keeping the radiation beam 15 focused on the servo-track 4; a customary focusing device (not shown) for keeping the radiation beam 15 focused on the recording layer 6; and a customary addressing device (not shown) for retrieving via a specific address, as has been described, for example, in EP-A 0 265 904 and NL-A 8800151 (to which EP-A 0 326 206 and U.S. Pat. No. 4,901,300 correspond). Opposite to the read/write head 14, on the other side of the record carrier 1, is a magnetic field modulator (MFM) 16 for generating a magnetic field H directed substantially perpendicularly to the recording layer 6 in the area of the recording layer 6 radiated by the radiation beam 15. The magnetic field modulator 16 is rigidly attached to the read/write head 14 by means of a bracket 17. The read/write head 14, as well as the magnetic field modulator 16, may be moved radially relative to the record carrier 1 by means of a displacement system 18, the bracket 17 ensuring that the magnetic field modulator 16 continues to be positioned opposite to the read/write head 14. The magnetic field modulator 16 is of a type in which the direction of the generated magnetic field can be modulated in accordance with a binary recording signal Vm. Such a magnetic field modulator has been described in detail, for example, in Dutch Patent Application No. 8702451 (to which EP-A 0 312 143 corresponds) which is incorporated herein by reference.

The device 10 further comprises a control circuit 19a for controlling the read/write head 14 and the displacement system 18, and for generating the recording signal Vm. When information is recorded, the servo-track 4 is scanned by the radiation beam 15, whose intensity is set to a recording intensity sufficiently high for heating up the part of the record carrier 6 scanned by the radiation beam 15 near to the Curie temperature of the material of the recording layer 6. At the same time, the generated magnetic field H is modulated in accordance with the information to be recorded, as a result of which a pattern of marks in the form of magnetic domains are formed in the scanned part of the servo-track 4, which pattern corresponds to the recording signal Vm. The domains which have been obtained may be detected optically (as will be further described in detail below).

The recording device 10 still further comprises a processing unit 19b which is coupled to the control circuit 19a via a two-way data bus 19c. The data bus 19c may be a serial (1-bit-wide) or a parallel (multi-bit-wide) data bus. The processing unit 19b receives via a two-way (input and output) bus 19d a data pattern which is to be encoded by means of an error detection and correction algorithm (CIRC or other Reed-Solomon code) in the processing unit 19b. The information pattern thus obtained is applied to the control unit 19a via the bus 19c, and so is a setting for the recording intensity of the radiation beam 15 with which the information pattern is recorded in the recording layer 6 of the record carrier 1.

An information pattern read out by the read/write head 14 and having signal shape V1 is transferred by the control circuit 19a over the bus 19c to the processing unit 19b, which attempts to encode the data pattern from the information pattern by means of the error detection and correction algorithm. The processing unit 19b establishes an error rate occurring in the data pattern and, on the basis of the error rate, determines a setting signal for setting the recording intensity of the radiation beam 15. Thereafter, the control circuit 19a receives the setting signal over bus 19c.

FIG. 3 illustrates the variation of the recording signal Vm over time, the associated magnetic field H over time and the resulting pattern of magnetic domains with different directions of magnetization over time. Domains with different directions of magnetization are denoted by different reference characters, i.e., 30 and 31. The middle of the servo-track 4 in which the pattern is recorded is diagrammatically shown by a line 4'. The pattern of magnetic domains 30 and 31 may be read out by the read/write head 14 by scanning the pattern with a scanning beam of linearly polarized light. Upon reflection of the radiated beam, the polarization direction of the radiated beam is turned in a direction determined by the direction of the magnetization of the scanned portion of the recording layer 6. In this manner, a modulation pattern of variations of polarization directions is obtained, which pattern corresponds to the scanned pattern of the magnetic domains 30 and 31. This modulation is detected in a customary fashion by the read/write head 14 with the aid of, for example, a Wollaston prism, photoelectric converters and an amplifier circuit which converts the output signals of the photoelectric converters into a reading signal V1 which represents the read out pattern as described, for example, in Dutch Patent Application NL-A 8602304.

One of the major aspects for recording is the reliability with which the recorded information can be read out. A known magnitude for which reading reliability can be expressed for recorded CD-A or CD-ROM signals is the so-called "(Block) Error Rate" (BLER for short). The magnitude BLER denotes the number of (EFM) blocks per unit of time in which one or more uncorrectable errors have been detected by means of the error detection and correction algorithm.

Figure 4:
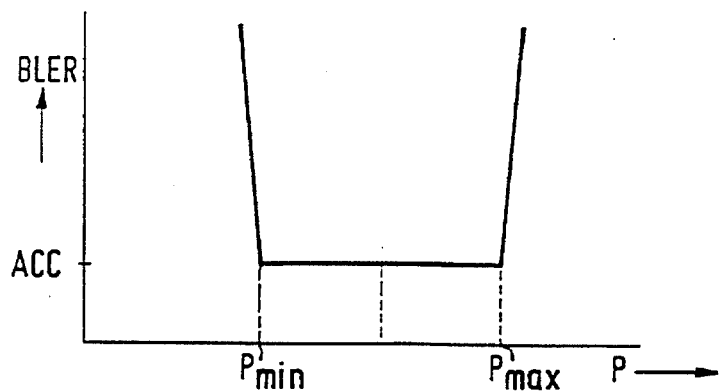
FIG. 4 shows reading reliability as a function of recording intensity.

FIG. 4 shows the behavior of the BLER value as a function of the recording intensity P. It appears that the BLER value within a range from $P_{min}$ to $P_{max}$ substantially adopts a constant minimum value, whereas outside this range the BLER value increases rapidly. Between the values $P_{min}$ and $P_{max}$ the reading reliability is substantially insensitive to intensity variations which are unavoidable as a result of the variety of tolerances in the recording system.

The BLER values shown in FIG. 4 are a function of the recording intensity P for a specific scanning velocity of the track 4 of FIGS. 1a and 1b during recording. The optimum recording intensity is not situated midway between $P_{min}$ and $P_{max}$, but just above $P_{min}$. The value of the optimum recording intensity may be determined in advance for a specific record carrier. Accordingly, prior to the recording of the information on that record carrier, the recording intensity of the recording device may be set at that value.

However, the following problems can occur:
1) There can be a large variation in the radiation sensitivity of recording layers, even though they are made of the same magneto-optical material. This is caused by the customarily applied method of depositing the recording layer, such as, for example, by sputtering.
2) There can be a great influence of the scanning velocity on the optimum recording intensity. This is especially a problem if the recording velocity for various recording devices varies strongly, as is the case, for example, with recording devices for CD signals in which the permissible recording velocity is situated between 1.2 m/sec and 1.4 m/sec.
3) Accurately determining an absolute radiation power can be a major problem. The mutual spread of power meters is of the order of 10%. In addition, different adjustment conditions cause additional deviations to occur.
4) Finally, the shape of the scanned spot caused by the radiation beam on the recording layer 6 and the wavelength of the radiation can influence the optimum recording intensity.

All of this means that the variation in the optimum recording intensity is so large that it cannot be guaranteed that for a fixed setting of the recording intensity the recording intensity will be within the recording window of a record carrier in which the BLER value is low.

A method will be described hereinafter in which the optimum recording intensity can be set reliably and simply. A preferred embodiment of such a method, according to the invention, will be described with reference to FIG. 5, in which a flow chart of this preferred embodiment is shown.

Figure 5:
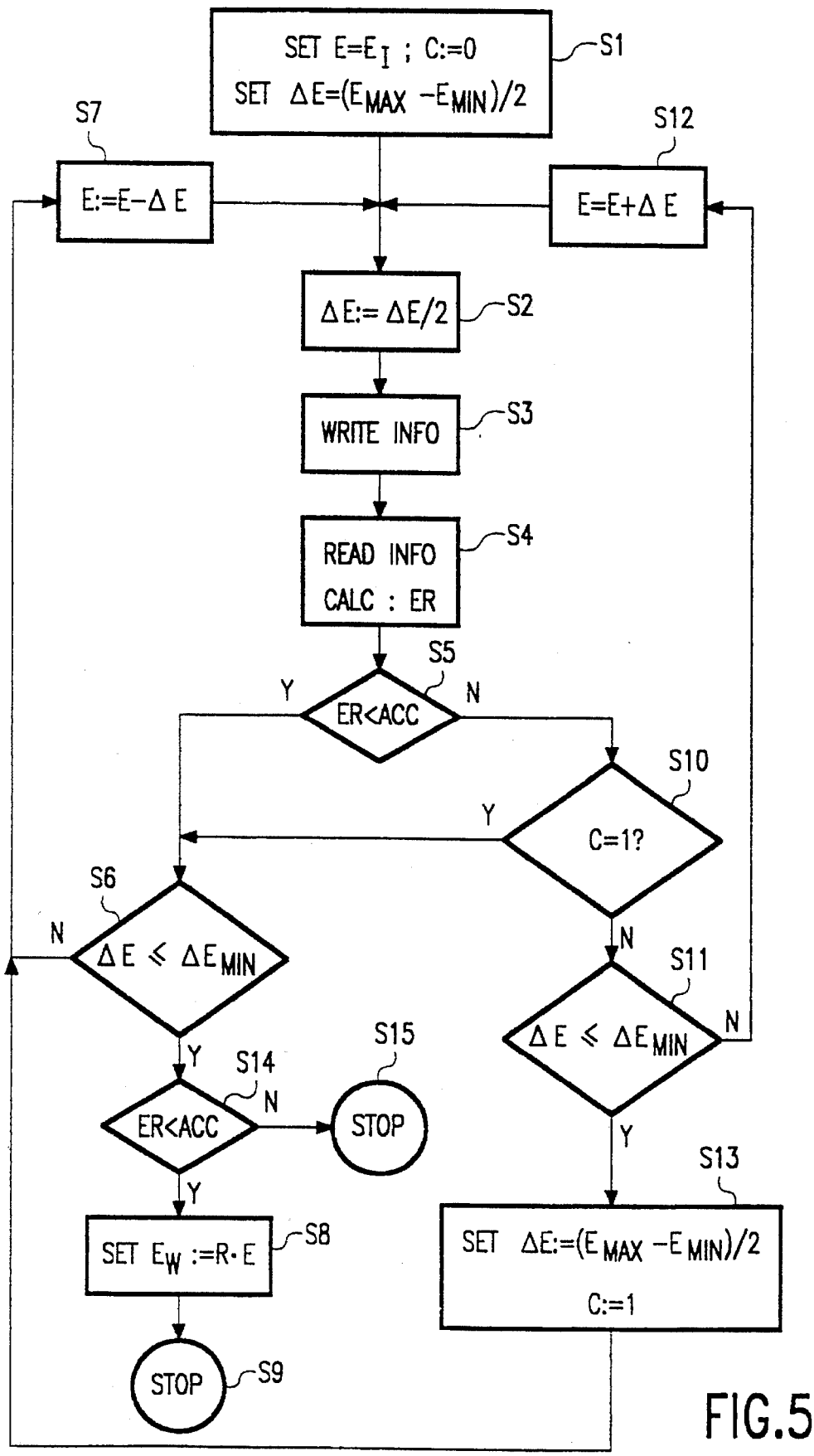
FIG. 5 shows a flow chart of a preferred embodiment for a method of setting the recording intensity according to the invention.

FIG. 5 shows a flow chart representing the preferred embodiment of a method according to the invention, by which an optimum setting of the recording intensity for the radiation beam 15 in a recording device as shown in FIG. 2 is found. In a first step, step $S_1$ an initial recording intensity $E_I$ and an initial step size $\Delta E$, which denotes the change in the recording intensity E, are set. The initial recording intensity $E_I$ is selected to be in the middle of the setting range of the intensity E of the radiation beam 15. The step size $\Delta E$ is $(E_{max} - E_{min})/2$. $E_{max}$ and $E_{min}$ are the top and bottom limits respectively, of the setting range of the intensity E of the radiation beam 15. In a next step, step $S_2$, the step size $\Delta E$ is halved. By setting the step size $\Delta E$, in step $S_2$, it is ensured that a next setting of the recording intensity E will be either the minimum intensity $E_{min}$ plus a quarter of the total setting range, or the maximum intensity $E_{max}$ minus a quarter of the setting range.

In a third step, step $S_3$, information is recorded on the record carrier with the set recording intensity E. In a next step, step $S_4$, the recorded information is read from the record carrier, and the error rate ER is determined on the basis of the read out information. In a next step, step $S_5$, a determination is made as to whether the error rate ER lies below an acceptable level ACC. If the error rate ER lies below a desired level ACC, in a next step, step 5b, a determination is made as to whether the step size $\Delta E$ is smaller than or equal to a minimum step size $\Delta E_{min}$. If it is not, then the recording intensity E is adjusted with the step size $\Delta E$, in a next step, step $S_7$, after which the steps $S_2$, $S_3$, $S_4$ and $S_5$ are repeated. If $\Delta E_{min}$ is less than the $\Delta E$, then the desired recording intensity $E_W$ is set in a next step, step $S_8$, subsequent to a step $S_{14}$ in which a determination is again whether as to the error rate ER lies below an acceptable level ACC. The desired recording intensity EW is equal to a constant R multiplied by the recording intensity E set at that moment. The constant R is a factor larger than 1.1 and smaller than 2.2. In magneto-optical recording this factor preferably lies between the boundaries 1.5 and 1.7. Once the desired recording intensity $E_W$ has been set, the program stops at step $S_9$.

Figure 6:
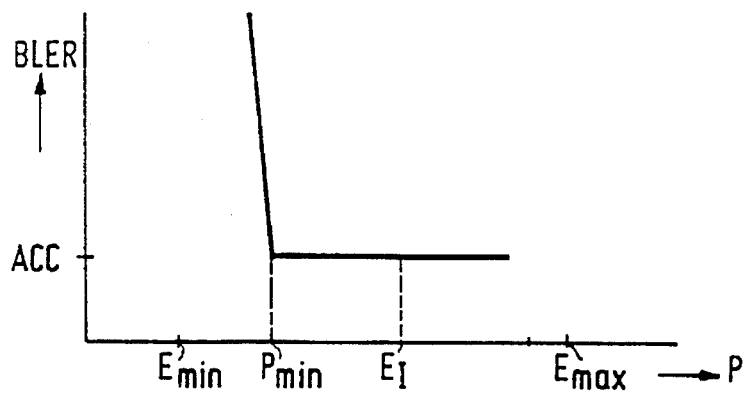
FIG. 6 shows an instance of an initial recording intensity with respect to a recording window in an error rate characteristic.

The part of the method according to the invention described hereinbefore determines the bottom $P_{min}$ of the recording window represented in FIG. 4 because it has been assumed that the initial setting of the recording intensity $E_1$ is situated somewhere in the recording window between $P_{min}$ and $P_{max}$. FIG. 6 shows the situation where the initial recording intensity $E_I$ is situated in the recording window between $P_{min}$ and $P_{max}$.

It will be evident that since in step $S_7$ the set recording intensity is constantly reduced by a step size $\Delta E$, once a specific step has been taken, the recording intensity E at that moment may be below the threshold $P_{min}$ of the recording window. This would appear in a next calculation of the error rate ER in step $S_4$ and in the determination, in step $S_5$, as to whether the error rate ER is below the acceptable error level ACC. In this case, step $S_5$ will be followed by a step $S_{10}$, in which a determination is made as to whether a counter is set and has the value of unity. If the counter has not been set, in a step $S_{11}$ a determination is made as to whether the step size $\Delta E$ in the recording intensity E is smaller than or equal to the minimum step size $\Delta E_{min}$. If this is not, the recording intensity E is increased by the step $\Delta E$ in a subsequent step, step $S_{12}$. Thereafter steps $S_2$–$S_5$ are repeated as described above.

In the manner described hereinbefore, the corner $P_{min}$ in the error rate ER characteristic and the associated recording intensity E are found very rapidly. The recording intensity E found in that manner is used as a basis for determining a desired recording intensity $E_W$ which is found by multiplying the recording intensity E by a constant R. The result is that information on the record carrier 6 is recorded with an intensity exceeding the minimum recording intensity $P_{min}$, with which the information can still be read out with an acceptable error rate ACC.

The above-described method works out correctly as long as the initial recording intensity $E_I$ lies within the recording window or below the minimum recording intensity $P_{min}$. If the initial recording intensity $E_I$ lies above $P_{max}$, i.e., in the corner between the recording window and the rising part of the error rate characteristic, and the method described above were used, the read/write head 14 would have its radiation beam 15 set at an ever higher recording intensity. This would mean that the setting control worked in the wrong way. Therefore, after a number of iteration steps have been made in which the intensity step size $\Delta E$ is constantly reduced and it is determined in step $S_{11}$ that the step size $\Delta E$ is smaller than the minimum step size $\Delta E_{min}$, in a step $S_{13}$ the step size is again made equal to the initial step size. Step $S_1$ is used as a basis. In addition, a count C is made equal to 1 in step $S_{13}$. From there a loop back is made to step $S_7$ of the procedure described above. In step $S_7$, the setting for the recording intensity E is modified so that the recording intensity E is reduced. Thereafter, the steps $S_2$, $S_3$, $S_4$ and $S_5$ are subsequently carried out. At that point, two situations may again exist: the error rate ER may be below or above the acceptable level ALL. If the error rate ER indeed lies below the acceptable level ACC, the recording intensity for the next test is reduced via steps $S_6$ and $S_7$. However, if the error rate ER is still above the acceptable level ACC, a determination is made as to whether the count C is actually equal to 1 in step $S_{10}$. If this is the case, the method is looped back to steps $S_6$ and $S_7$, so that despite the fact that the error rate ER exceeds the acceptable level ACC, in a next test cycle the recording intensity E is lower than the previous recording intensity in a previous test cycle. Worded differently, from point $E_I$ first several test cycles are performed with recording intensities E which are greater than the initial recording intensity $E_I$, after which a loop back is made to a recording intensity E which is smaller than $E_I$.

Figure 7:
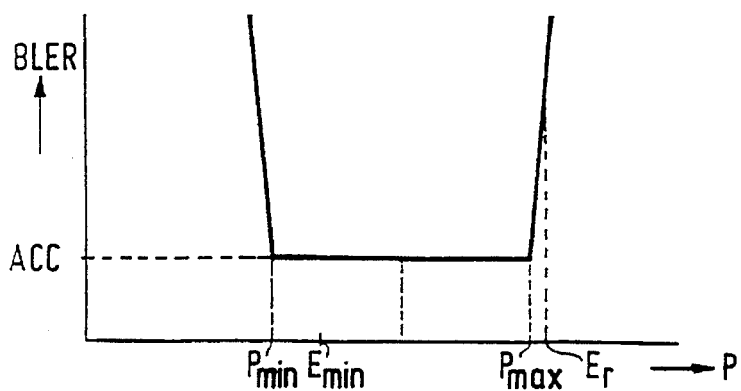
FIG. 7 shows another instance of an initial recording intensity with respect to the recording window.

The set counter with count 1 provides that a test cycle is made with an ever decreasing recording intensity E, which cycle results in a move to the left in the error rate characteristic towards the flat recording window between $P_{max}$ and $P_{min}$. The moment this flat recording window has been reached, each next setting of the recording intensity E will be lower, until either the minimum adjustable recording intensity $E_{min}$ (in conformity with FIG. 7) is reached, or the minimum recording intensity $P_{min}$ is reached. In that case, the corner of the minimum recording intensity curve is found sufficiently accurately by performing several iterative steps around this corner. Therefore, it is necessary, in step $S_5$, after the error rate ER has been found to be lower than the acceptable level ACC, to reset the count of the counter to zero. This is to take place between the steps $S_5$ and $S_6$ while a loop back is to be made from step $S_{10}$ to $S_6$.

By starting from the middle of the setting range of the recording intensity in accordance with the method in the preferred embodiment and by halving the step size after each iteration, the corner $P_{min}$ in the error rate characteristic may generally be found with precision after four or five steps. Accordingly, in the preferred embodiment of the method according to the invention, the optimum setting for the recording intensity of the read/write head 14 is found very rapidly.

Nevertheless, there are various other methods of finding an optimum radiation intensity for the radiation beam 15. One such method will be described hereinbelow by way of example.

In one of the other methods, media calibration is performed in defined zones on the inside edge and/or outside edge of the record carrier 1. First, a test region which is to be recorded is erased with a sufficiently high erase power, so that a test may be made in a clean test area. Then, starting from a minimum setting of the recording intensity and then with recording intensities which are increased by $1/10$ mW steps, several sectors of, for example, 512 user bytes each are recorded at each intensity setting in order to consider the reliability for each recording intensity setting. Then the recorded sectors are read out and the associated error rate ER is determined for each recording intensity value. A reliability criterion can be that, with a specific recording intensity, not more than a single one of the number of recorded sectors is allowed to be erroneous, i.e., incorrigible. The minimum recording intensity may now be derived from the series of recorded sectors for which recorded information is qualified as sufficiently reliable. The recording intensity for the bottom limit of the recording window is used in the manner described hereinbefore for determining the optimum recording intensity for the read/write head 14. The multiplicand R, which is the ratio of the optimum recording intensity to the minimum recording intensity, is to be selected to be around 1.6.

It will be evident that the method described with reference to FIG. 5 may be modified in many ways. For example, the step size in recording intensity $\Delta E$ for the successive iterations may be kept constant until a corner in the error rate characteristic is found. Thereafter, the step size could be reduced, and the range of the radiation intensities in which the found corner of the error rate characteristic is situated could be covered with this smaller step size, so that the recording intensity belonging to the corner of the curve is determined more accurately and a smaller range is determined in which the corner lies. Then the step size $\Delta E$ could again be reduced, and so on, until a desired minimum step size $\Delta E$ is attained. Obviously, a larger number of steps would be necessary for this modification which implies that the adjustment of the recording device to the record carrier available at that moment will take longer.

Furthermore, a combination of the method described above and the method described with reference to FIG. 5 is possible. First the setting range of the radiation source is passed through with a reasonably large step size $\Delta E$, so that, once several steps have been made, the corner of the error rate characteristic and the associated path determined by the step size are known. Then, starting from the recording intensity set at that moment, the method could be followed which has been described with reference to FIG. 5. In that case, the method steps $S_{10}$, $S_{13}$, $S_{14}$ and $S_{15}$ in the flow chart shown in FIG. 5 may be omitted.

The methods described hereinbefore are applicable to many media, such as MO or phase-change materials. However, if a group of media has a relatively narrow recording window in the error rate characteristic, it is desirable to not only determine the bottom limit of the window, but also the top limit of the recording window in the same manner. Thereafter, the average of the top and bottom limits can be taken as the optimum power.

We claim:

1. A method for recording one or more signals encoded by means of an error detection and correction algorithm in a track on a record carrier of a type that can be overwritten, the method comprising the following steps:

(a) recording a test information pattern on the record carrier by means of a radiation beam being set at a selected recording intensity to produce a recorded information pattern on the record carrier, the test information pattern having been encoded by means of the error detection and correction algorithm;

(b) reading the recorded information pattern from the record carrier to produce a reproduced information pattern;

(c) determining an error rate for the reproduced information pattern on the basis of the error detection and correction algorithm;

(d) selecting an optimal recording intensity for use in recording the one or more signals on the basis of the error rate; and (e) recording the one or more signals on the record carrier by means of the radiation beam being set at the optimal recording intensity.

2. The method as claimed in claim 1, wherein in step (a), the test information pattern is recorded a plurality of times by means of the radiation beam to produce a plurality of recorded information patterns, the radiation beam being set at a different selected recording intensity for each recording of the test information pattern;

in step (b) each of the recorded information patterns recorded on the record carrier is read to produce a plurality of reproduced information patterns;

in step (c), an error rate for each of the reproduced information patterns is determined, the error rate for each of the reproduced information patterns being determined on the basis of the error detection and correction algorithm; and in step (d), the optimal recording intensity is determined by (i) determining from the error rates of the reproduced information patterns a minimum recording intensity for which the error rate of one of the reproduced information patterns is at or below an acceptable error rate, and (ii) multiplying the minimum recording intensity by a fixed constant.

3. The method as claimed in claim 2, wherein the constant is a value between 1.1 and 2.2.

4. The method as claimed in claim 3, wherein the constant is a value substantially equal to 1.6.

5. The method as claimed in claim 2, wherein the test information pattern includes at least three information blocks, and the acceptable error rate is a maximum of one erroneous and incorrigible information block.

6. The method as claimed in claim 1, wherein steps (a) through (c) are repeated a plurality of times, and each time step (a) is performed, the radiation beam is set at a different selected recording intensity.

7. The method as claimed in claim 6, wherein each time steps (a) through (c) are performed, the selected recording intensity in step (a) is modified from the selected recording intensity used the previous time step (a) was performed by a step size determined on the basis of the error rate found the previous time step (c) was performed; steps (a) through (c) are repeated until a minimum recording intensity which produces an error rate in step (c) which is at or below an acceptable error rate is found; and the optimal recording intensity is obtained by multiplying the minimum recording intensity by a fixed constant.

8. The method as claimed in claim 7, wherein the test information pattern includes at least three information blocks, and the acceptable error rate is a maximum of one erroneous and incorrigible information block.

9. The method as claimed in claim 7, wherein the radiation beam has a setting range of recording intensities; and the first time steps (a) through (c) are performed, the selected recording intensity is set in the middle of the setting range.

10. The method as claimed in claim 9, wherein the step size is initially substantially equal to one quarter of the setting range.

11. The method as claimed in claim 7, wherein the step size is reduced each time the error rate found in step (c) differs substantially from the error rate found the previous time step (c) was performed.

12. The method as claimed in claim 11, wherein the step size is reduced by one-half each time the step size is reduced.

13. The method as claimed in claim 7, wherein the selected recording intensity is reduced each time step (a) is performed, unless the error rate found the previous time step (c) was performed was above the acceptable error rate.

14. The method as claimed in claim 13, wherein if the error rate found the previous time step (c) was performed was above the acceptable error rate, the next time step (a) is performed, the selected recording intensity is increased.

15. The method as claimed in claim 7, wherein the constant is a value between 1.1 and 2.2.

16. The method as claimed in claim 15, wherein the constant is a value substantially equal to 1.6.

17. A recording device for recording one or more signals in substantially parallel tracks on a record carrier of a type that can be overwritten, the device comprising:

recording means for recording a test information pattern and the one or more signals on the record carrier by means of a radiation beam having a recording intensity;

setting means for setting the recording intensity of the radiation beam at (a) a selected recording intensity, on the basis of a test information pattern, for recording the test setting signal, and (b) at an optimal recording intensity, on the basis of an optimal setting signal, for recording the one or more signals;

reading means for reading the test information pattern, after the test information pattern has been recorded on the record carrier, to produce a reproduced information pattern; and processing means for (a) producing the test information pattern and the one or more signals by means of an error detection and correction algorithm, (b) determining an error rate for the reproduced information pattern on the basis of the error detection and correction algorithm and (c) producing the test setting signal and the optimal setting signal, the optimal setting signal being produced on the basis of the error rate.

18. The device as claimed in claim 17, wherein said recording means is adapted to record the test information pattern a plurality of times by means of the radiation beam to produce a plurality of recorded information patterns;

said setting means is adapted to set the recording intensity of the radiation beam each time the test information pattern is recorded by said recording means at a different selected recording intensity on the basis of a different test setting signal;

said reading means is adapted to read the recorded information patterns to produce reproduced information patterns; and said processing means is adapted to (d) determine an error rate, on the basis of the error rate detection and correction algorithm, for each of the reproduced information patterns; (e) produce each of the different test setting signals; and (f) produce the optimal setting signal on the basis of the error rate of at least one of the reproduced information patterns.

19. The device as claimed in claim 18, wherein to produce the optimal setting signal, said processing means is further adapted to (g) determine from the error rates of the reproduced information patterns a minimum recording intensity for which the error rate of one of the reproduced information patterns is at or below an acceptable error rate, and (h) multiply the minimum recording intensity by a fixed constant to obtain the optimal recording intensity.

20. The device as claimed in claim 19, wherein the test information pattern includes at least three information blocks, and the acceptable error rate is a maximum of one erroneous and incorrigible information block.

21. The device as claimed in claim 19, wherein the constant is a value between 1.1 and 2.2.

22. The device as claimed in claim 21, wherein the constant is a value substantially equal to 1.6.

23. The device as claimed in claim 18, further comprising control means for controlling said recording means and said reading means in a manner whereby said recording means records the test information pattern all of the times the test information pattern is to be recorded, and thereafter, said reading means reads all of the recorded information patterns.

24. The device as claimed in claim 18, further comprising control means for controlling said recording means and said reading means in a manner whereby said recording means and said reading means operate in successive cycles, each of the cycles involving said recording means recording the information pattern once, and thereafter, said reading means reading the recorded test information pattern produced therefrom to produce the reproduced information pattern corresponding to the information pattern which was recorded by said recording means.

25. The device as claimed in claim 24, wherein said control means is adapted to control said processing means in a manner whereby in each of the cycles, said processing means determines the error rate for the reproduced information pattern corresponding to the test information pattern recorded by said recording means in that cycle, and produces a test setting signal which cause said setting means to modify the recording intensity of the radiation beam for recording the test information pattern in that cycle from the selected recording intensity at which the recording intensity of the radiation beam was set at when the test information pattern was recorded during the previous cycle by a step size determined on the basis of the error rate found in the previous cycle.

26. The device as claimed in claim 25, wherein the radiation beam has a setting range of recording intensities; and said processing means is further adapted to produce a first test setting signal which causes said setting means to set the recording intensity of the radiation beam at a selected recording intensity which is in the middle of the setting range the first time the test information pattern is recorded by said recording means.

27. The device as claimed in claim 26, wherein said processing means is further adapted to cause the step size to initially be substantially equal to one-quarter of the setting range.

28. The device as claimed in claim 25, wherein said processing means is further adapted to cause the step size to be reduced each time the error rate found in a cycle is substantially different from the error rate found in the previous cycle.

29. The device as claimed in claim 28, wherein said processing means is further adapted to cause the step size to be reduce by one-half each time the step size is reduced.

30. The device as claimed in claim 25, wherein said control means is further adapted to continue the cycles until a minimum recording intensity is found which is used to record the test information pattern and to produces a reproduced information pattern corresponding thereto and having an error rate which is at or below an acceptable error rate.

31. The device as claimed in claim 30, wherein to produce the optimal setting signal, said processing means is further adapted to multiply the minimum recording intensity by a fixed constant to obtain the optimal recording intensity.

32. The device as claimed in claim 31, wherein the constant is a value between 1.1 and 2.2.

33. The device as claimed in claim 32, wherein the constant is a value substantially equal to 1.6.

34. The device as claimed in claim 31, wherein the test information pattern includes at least three information blocks, and the acceptable error rate is a maximum of one erroneous and incorrigible information block.

* * * * *